United States Patent
Aoki (10) Patent No.: US 10,131,228 B2
(45) Date of Patent: Nov. 20, 2018

(54) HEAD-UP DISPLAY APPARATUS

(71) Applicant: Yazaki Corporation, Minato-ku, Tokyo (JP)

(72) Inventor: Kunimitsu Aoki, Susono (JP)

(73) Assignee: Yazaki Corporation, Minato-ku, Tokyo (JP)

( * ) Notice: Subject to any disclaimer, the term of this patent is extended or adjusted under 35 U.S.C. 154(b) by 201 days.

(21) Appl. No.: 15/247,173

(22) Filed: Aug. 25, 2016

(65) Prior Publication Data

US 2016/0362002 A1    Dec. 15, 2016

Related U.S. Application Data

(63) Continuation of application No. PCT/JP2015/058945, filed on Mar. 24, 2015.

(30) Foreign Application Priority Data

Mar. 25, 2014    (JP) .................. 2014-061599

(51) Int. Cl.
*B60K 35/00*    (2006.01)
*G02B 27/01*    (2006.01)
(Continued)

(52) U.S. Cl.
CPC .............. *B60K 35/00* (2013.01); *B60R 1/00* (2013.01); *G02B 26/0816* (2013.01);
(Continued)

(58) Field of Classification Search
CPC ............ B60K 35/00; B60K 2350/2052; G02B 26/0816; G02B 27/0101; G02B 27/0149;
(Continued)

(56) References Cited

U.S. PATENT DOCUMENTS 5,394,203 A * 2/1995 Murphy ................. G02B 27/01
                                                       353/13
5,537,251 A   7/1996 Shimada
(Continued)

FOREIGN PATENT DOCUMENTS

JP    S62-137236 A    6/1987
JP    H06-115382 A    4/1994
(Continued)

OTHER PUBLICATIONS

Translation of JP 2007-086226 A from https://www.jpaa.or.jp/english/patent/how_to_search.html, performed on May 7, 2018.*
(Continued)

*Primary Examiner* — Frank G Font
(74) *Attorney, Agent, or Firm* — Banner & Witcoff, Ltd.

(57) ABSTRACT

A head-up display apparatus stored in a storage space within an instrument panel of a vehicle for irradiating a display light into a projection area on an upper side of the instrument panel to form a virtual image, is provided. The apparatus includes a display for emitting the display light, a reflecting member supported swingably about a swing axis for reflecting the display light from the display toward the projection area, a drive mechanism arranged in the reflecting member for swinging the reflecting member, and a case storing the display, the reflecting member and the drive mechanism. The drive mechanism includes a drive part and a transmission part for transmitting a drive force of the drive part to the reflecting member. The drive mechanism is arranged at a position shifted from an optical path of the display light nearer the display than the reflecting member.

5 Claims, 6 Drawing Sheets

(51) Int. Cl.
*G02B 26/08* (2006.01)
*B60R 1/00* (2006.01)

(52) U.S. Cl.
CPC ..... *G02B 27/0101* (2013.01); *G02B 27/0149* (2013.01); *B60K 2350/2052* (2013.01); *B60K 2350/405* (2013.01); *B60R 2300/205* (2013.01); *G02B 2027/013* (2013.01); *G02B 2027/015* (2013.01); *G02B 2027/0154* (2013.01); *G02B 2027/0181* (2013.01)

(58) Field of Classification Search
CPC ........ G02B 2027/013; G02B 2027/015; G02B 2027/0154; G02B 2027/0181; B60R 1/00; B60R 2300/205
USPC ........................................... 359/221.2, 223.1
See application file for complete search history.

(56) References Cited

U.S. PATENT DOCUMENTS

| | | | | |
|---|---|---|---|---|
| 7,280,282 | B2 * | 10/2007 | Kageyama | G02B 27/0101 359/630 |
| 7,333,269 | B2 | 2/2008 | Shiobara et al. | |
| 7,532,175 | B2 * | 5/2009 | Aoki | G02B 27/0101 345/7 |
| 8,743,296 | B2 | 6/2014 | Ishida | |
| 9,612,463 | B2 * | 4/2017 | Pawusch | G02F 1/13306 |
| 2003/0223133 | A1 * | 12/2003 | Raines | G02B 27/0149 359/841 |
| 2006/0203351 | A1 * | 9/2006 | Kageyama | G02B 27/0101 359/630 |
| 2006/0291066 | A1 | 12/2006 | Shiobara et al. | |
| 2010/0067118 | A1 * | 3/2010 | Takahashi | G02B 27/01 359/633 |
| 2011/0170023 | A1 | 7/2011 | Ishida | |
| 2013/0194518 | A1 * | 8/2013 | Moussa | G02B 7/1821 349/11 |
| 2014/0132852 | A1 * | 5/2014 | Pawusch | G02B 27/0149 349/11 |
| 2015/0070771 | A1 * | 3/2015 | Jeon | G02B 27/0149 359/630 |

FOREIGN PATENT DOCUMENTS

| | | |
|---|---|---|
| JP | H06-273693 A | 9/1994 |
| JP | 2004-090713 A | 3/2004 |
| JP | 2006-143125 A | 6/2006 |
| JP | 2006-248322 A | 9/2006 |
| JP | 2007-086226 A | 4/2007 |
| JP | 2011-145393 A | 7/2011 |
| JP | 2012-240467 A | 12/2012 |
| JP | 2013-535700 A | 9/2013 |

OTHER PUBLICATIONS

Jun. 23, 2015—Written Opinion—App PCT/JP2015/058945.
Dec. 5, 2017—(JP) Notification of Reasons for Refusal—App 2014-061599, Eng Tran.
Jun. 23, 2015—International Search Report—Intl App PCT/JP2015/058945.
May 8, 2018—(JP) Notification of Reasons for Refusal—App 2014-061599, Eng Tran.

* cited by examiner

HEAD-UP DISPLAY APPARATUS

CROSS REFERENCE TO RELATED APPLICATIONS

This application is a continuation of PCT application No. PCT/JP2015/058945, which was filed on Mar. 24, 2015 based on Japanese Patent Application (No. 2014-061599) filed on Mar. 25, 2014, the contents of which are incorporated herein by reference.

BACKGROUND OF THE INVENTION

Field of the Invention

The invention relates to a head-up display apparatus which can project a virtual image in the projection area of a combiner arranged above a windshield or an instrument panel of a vehicle to visually confirm the foreground of a vehicle and such virtual image.

Description of Related Art

As a head-up display (HUD: Head Up Display) apparatus which displays a virtual image on a windshield of a vehicle to enable superimposed visual confirmation of the vehicle foreground and virtual image, there is known an apparatus which includes a liquid crystal display device, a reflecting mirror for reflecting a display light emitted by the liquid crystal display device, and a drive mechanism for swinging the reflecting mirror to adjust the reflection angle of the display light (see the Patent Literature 1: JP-A-2012-240467).

[Patent Literature 1] JP-A-2012-240467

Within a vehicle instrument panel where the head-up display apparatus is stored, there exist structure members such as a vehicle body, reinforcing members and various meters, which makes it difficult to secure a large space for storing the head-up display apparatus within the instrument panel. Thus, downsizing of the head-up display apparatus is desired.

SUMMARY

One or more embodiments provide a head-up display apparatus which can be downsized and thus can be installed in a small storage space.

In an aspect (1), one or more embodiments provide a head-up display apparatus stored in a storage space within an instrument panel of a vehicle for irradiating a display light into a projection area on an upper side of the instrument panel to form a virtual image. The head-up display apparatus is provided with a display for emitting the display light, a reflecting member supported swingably about a swing axis for reflecting the display light from the display toward the projection area, a drive mechanism arranged in the reflecting member for swinging the reflecting member, and a case storing the display, the reflecting member and the drive mechanism. The drive mechanism includes a drive part and a transmission part for transmitting a drive force of the drive part to the reflecting member. The drive mechanism is arranged at a position shifted from an optical path of the display light nearer the display than the reflecting member.

In an aspect (2), the drive mechanism is stored in a storage part provided with a recess part or a hole part formed in a side wall constituting the case.

In an aspect (3), the transmission part is provided with a transmission arm connected to one of the edges of the reflecting member in a direction perpendicular to the swing axis at a middle portion of the reflecting member along the swing axis. The reflecting member is swung, when the transmission arm is moved linearly by the drive part.

According to the aspect (1), a drive mechanism for swinging a reflecting member is arranged in a dead space which exists nearer to a display than the reflecting member and is shifted from the optical path of a display light, thereby enabling effective use of a space within a case. Thus, when compared with a structure where the drive mechanism is arranged on the side part of the reflecting member, the whole apparatus can be downsized. Therefore, the apparatus can be easily stored into the vehicle instrument panel to avoid having to secure a large storage space.

According to the aspect (2), by storing the drive mechanism in the storage part of the side wall of the case, the dimension of the case can be reduced by an amount corresponding to the thickness of the side wall of the case, thereby enabling further downsizing of the whole apparatus. Also, since the mechanism parts of the drive mechanism are stored directly into the storage part of the side wall for incorporation, a storage case for covering the mechanism parts can be omitted.

According to the aspect (3), a drive part is used to move linearly a transmission arm, which is connected to one of the edges of the reflecting member, in a direction perpendicular to the swing axis at the middle part of the reflecting member along the swing axis. Therefore, when compared with a structure in which the reflecting member is swung by applying a rotation force to one of side support portions for supporting the reflecting member swingably about the swing axis, torsion of the reflecting member can be suppressed, thereby enabling excellent formation of a virtual image in the projection area.

According to one or more embodiments, it is possible to provide a head-up display apparatus which can be downsized and thus can be installed in a small space.

Brief description has been given heretofore of the invention. Further, when the mode for carrying out the invention (which is hereinafter called an embodiment) to be described below is read through with reference to the appended drawings, the details of the invention can be understood more clearly.

DETAILED DESCRIPTION

Description is given below of examples of the embodiment of the invention with reference to the drawings.

Figure 1:
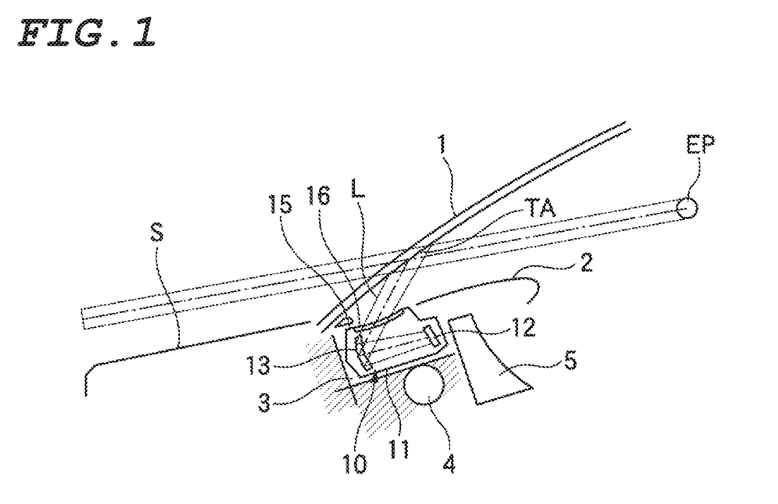
FIG. 1 is a schematic side view to explain the whole structure of a head-up display apparatus according to an embodiment of the invention.
Figure 2:
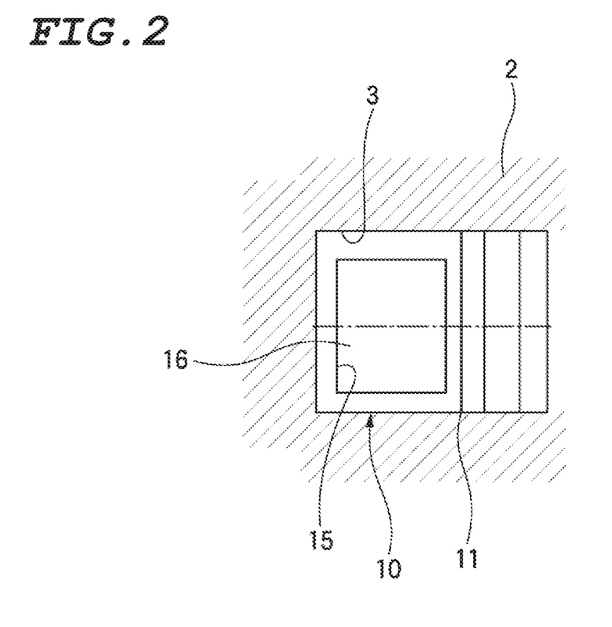
FIG. 2 is a schematic plan view of a vehicle instrument panel in which the head-up display apparatus according to the embodiment is stored.
Figure 3:
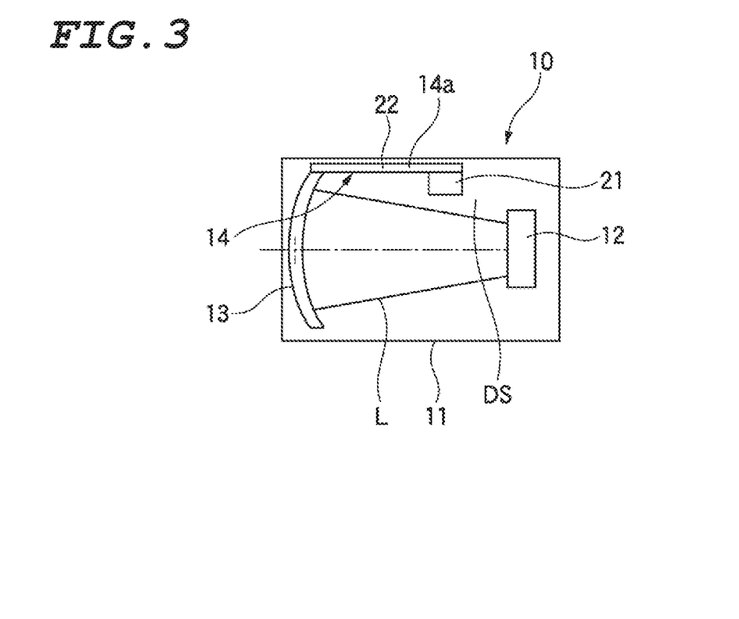
FIG. 3 is a typical view of the internal structure of the head-up display apparatus according to the embodiment.
Figure 4:
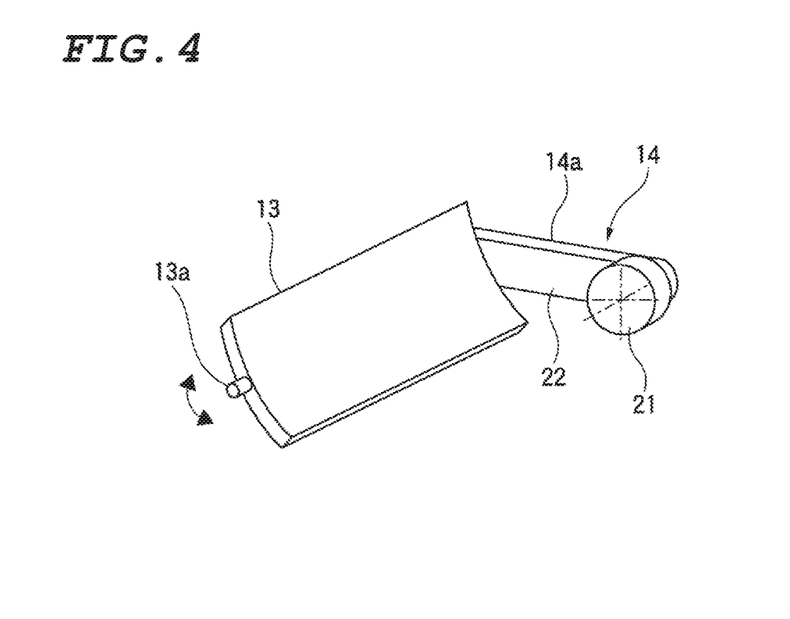
FIG. 4 is a perspective view of a reflecting member and a drive mechanism included in the head-up display apparatus according to the embodiment.
Figure 5:
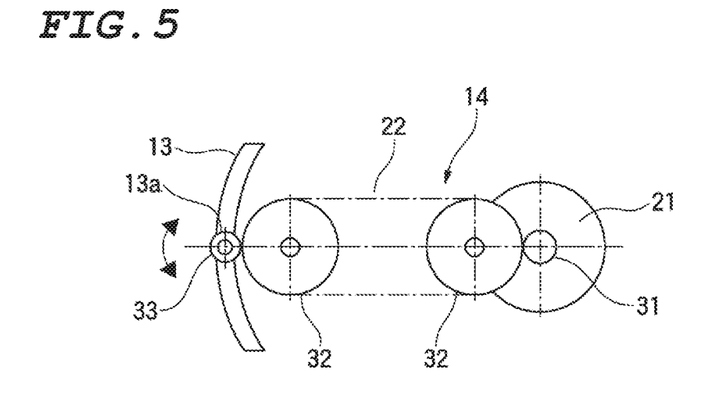
FIG. 5 is a typical view of the reflecting member and drive mechanism of the head-up display apparatus according to the embodiment, when viewed from the side surfaces thereof.

FIG. 1 is a schematic side view to explain the whole structure of a head-up display apparatus according to an embodiment of the invention. FIG. 2 is a schematic plan view of a vehicle instrument panel in which the head-up display apparatus according to the embodiment is stored. FIG. 3 is atypical view of the internal structure of the head-up display apparatus according to the embodiment. FIG. 4 is a perspective view of a reflecting member and a drive mechanism included in the head-up display apparatus according to the embodiment. FIG. 5 is a typical view of the reflecting member and drive mechanism of the head-up display apparatus according to the embodiment, when viewed from the side surfaces thereof.

As shown in FIGS. 1 and 2, the head-up display apparatus 10 of the embodiment projects a display light L in a projection area TA of a windshield 1 of a vehicle S such as an automobile to form a virtual image of display information in the projection area TA, thereby enabling a driver to visually confirm the foreground of the vehicle S and virtual image in a superimposed manner which are visually confirmed from the eye point EP of the driver through the windshield 1.

The head-up display apparatus 10 is stored in a storage space 3 within an instrument panel 2. The instrument panel 2 includes therein structure members, for example, reinforcing members 4 such as ring hose and various meters 5, while the storage space 3 is surrounded by the structure members.

As shown in FIG. 3, the head-up display apparatus 10 includes a case 11, a display 12, a reflecting member 13 and a drive mechanism 14.

The case 11 is formed of synthetic resin or the like and stores therein the display 12, reflecting member 13 and drive mechanism 14. The case 11 includes in the upper portion thereof a window part 15 on which a light transmitting plate 16 having transparency is provided.

The display 12 is constituted of, for example, a self-luminous device display, a fluorescent display tube, an EL display, or a liquid crystal display with aback light; and, it forms a virtual image and emits the display light L of the virtual image. The display 12 is arranged in such portion the case 11 as exists on the backward side of the vehicle S and irradiates the display light L toward the forward side of the vehicle S. The display light emitted from the display 12 spreads gradually toward the irradiation direction.

As shown in FIG. 4, the reflecting member 13 is formed of an aspherical mirror and reflects the display light L (which is irradiated from the display 12) through the light transmitting plate 16 toward the projection area TA. The display light L reflected by the reflecting member 13 is transmitted through the light transmitting plate 16 and is irradiated into the projection area TA in the windshield 1 of the vehicle S. The reflecting member 13 is arranged on such side of the interior of the case 11 as exists on the forward side of the vehicle S. The reflecting member 13 includes, in the middle portion of the vertical-direction two side portions thereof, a rotation shaft 13a and is supported swingably with a horizontal axis passing through the rotation shaft 13a as the swing axis thereof.

The drive mechanism 14 is used to swing the reflecting member 13. When the reflecting member 13 is swung by the drive mechanism 14, the irradiation angle of the display light L reflected by the reflecting member 13 into the projection area TA is changed, whereby the visual confirmation position of the virtual image is changed according to the height of the eye point EP of the driver.

As shown in FIG. 5, the drive mechanism 14 includes a drive part 21 and a transmission part 22. As the drive part 21, for example, there are used various drive motors such as a stepping motor. The drive part 21 includes a drive gear 31. When power is supplied, the drive part 21 rotates the drive gear 31.

The transmission part 22 includes multiple transmission gears 32 engaged with each other. The transmission gears 32 arranged on the drive part 21 side are engaged with the drive gear 31. Also, the transmission gears 32 on the reflecting member 13 side are engaged with a driven gear 33 provided on such side of the rotation shaft 13a as exists on one side of the reflecting member 13. The transmission part 22 transmits the rotation power of the drive gear 31 through the transmission gears 32 to the driven gear 33 of the reflecting member 13.

The drive mechanism 14 includes a storage case 14a which stores therein mechanism parts such as the drive motor of the drive part 21 and the transmission gears 32 of the transmission part 22.

In the head-up display apparatus 10, on supplying power to the drive part 21 of the drive mechanism 14, the drive gear 31 of the drive part 21 is rotated, and the rotation power of the drive gear 31 is transmitted to the driven gear 33 by the transmission gears 32 of the transmission part 22, thereby swinging the reflecting member 13. This changes the irradiation angle of the display light L reflected by the reflecting member 13 into the projection area TA, whereby the visual confirmation position of the virtual image is changed according to the height of the eye point EP of the driver.

Here, as described above, within the case 11, the display light L emitted from the display 12 spreads gradually in the irradiation direction, that is, toward the reflecting member 13. Accordingly, within the case 11 having a rectangular shape in its plan view, in the side portion of the optical path of the display light L between the display 12 and reflecting member 13, there is formed a dead space DS through which the display light L does not pass.

And, in the head-up display apparatus 10 of this embodiment, in the dead space DS shifted from the optical path of the display light L emitted from the display 12 within the case 11, there is arranged the drive mechanism 14. Specifically, on one of the side portions of the optical path of the display light L from the display 12 within the case 11, the drive mechanism 14 is arranged in the dead space DS shifted from this optical path.

Here, description is given of a comparison example.

Figure 6:
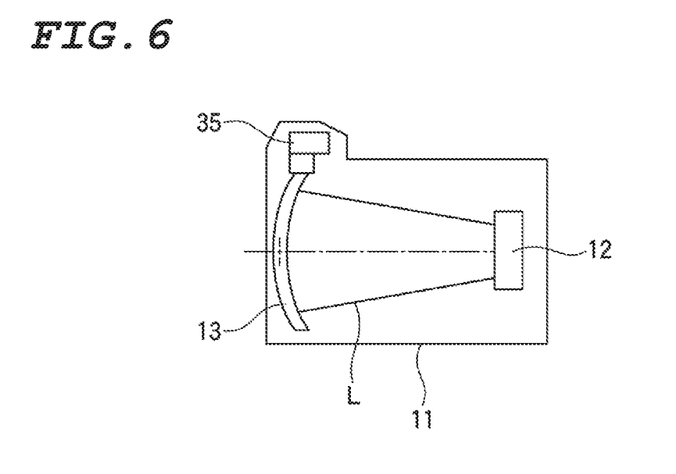
FIG. 6 is a typical view of the internal structure of a head-up display apparatus according to a comparison example.
Figure 7:
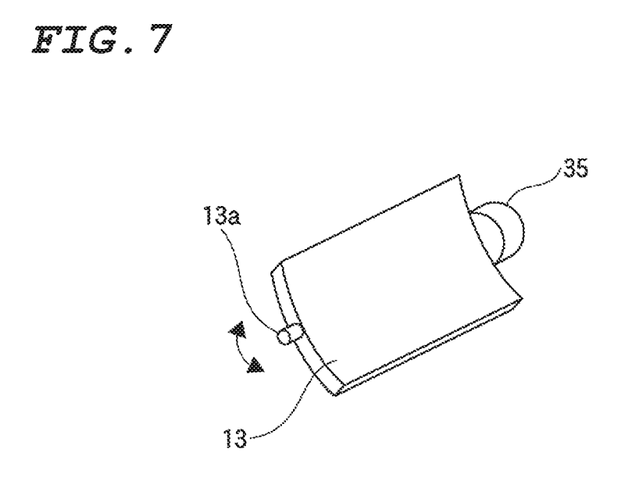
FIG. 7 is a perspective view of a reflecting member and a drive mechanism included in the head-up display apparatus according to the comparison example.

FIG. 6 is a typical view of the internal structure of a head-up display apparatus according to the comparison example. FIG. 7 is a perspective view of a reflecting member and a drive mechanism according to the head-up display apparatus of the comparison example.

As shown in FIGS. 6 and 7, the comparison example comprises, in one of the side portions of the reflecting member 13, a drive mechanism 35 including a drive motor and a reduction gear. The reflecting member 13 is swung about a swing axis constituted of a horizontal axis by the drive mechanism 35. Thus, in the case that the drive mechanism 35 is arranged in one side portion of the reflecting member 13, one side portion of the reflecting member 13 requires a space for arranging the drive mechanism 35. Therefore, the one side portion of the case 11 existing on the forward side of the vehicle is caused to expand laterally.

It is difficult to secure the large space 3 within the instrumental panel 2 of the vehicle S because structure members such as the reinforcing member 4 and various meters 5 are present there. Particularly, in such portion of the storage space 3 as exists on the forward side of the vehicle S, there is arranged a cowl separating an engine room from a vehicle room. The shape of the cowl is restricted from the viewpoint of body rigidity maintenance, pedestrian protection and so on, which makes it difficult to change the cowl shape for securing the large storage space 3. Therefore, particularly, it is difficult that such portion of the storage space 3 as exists on the forward side of the vehicle S is secured large.

Accordingly, like the comparison example, in the structure where the drive mechanism 35 is arranged in the side portion of the reflecting member 13 and such one of the side portions of the case 11 as exists on the forward side of the vehicle S, securing of the storage space 3 in the instrument panel 2 of the vehicle S is probably difficult.

Meanwhile, according to the head-up display apparatus 10 of the embodiment, the drive mechanism 14 for swinging the reflecting member 13 is disposed in the dead space DS, that is, in a position shifted from the optical path of the display light L passing such portion as extends from the reflecting member 13 toward the display 12, thereby enabling effective use of the space within the case 11. Thus, when compared with the structure where the drive mechanism 14 is arranged in the side portion of the reflecting member 13, the whole apparatus can be downsized, thereby, particularly, enabling suppression of the width dimension of the side thereof where the reflecting member 13 is arranged on such front side of the vehicle S as is difficult to secure a space because of presence of the cowl and so on. Thus, the apparatus 10 can be easily stored into the instrument panel 2 of the vehicle S difficult to secure the large storage space 3.

Here, in the above embodiment, the multiple transmission gears 32 of the transmission part 22 are engaged with the drive gear 31 and driven gear 33 to transmit the rotation force of the drive part 21 to the reflecting member 13. However, a mechanism to transmit the rotation force of the drive part 21 to the reflecting member 13 is not limited the mechanism using the transmission gears 32.

Figure 8:
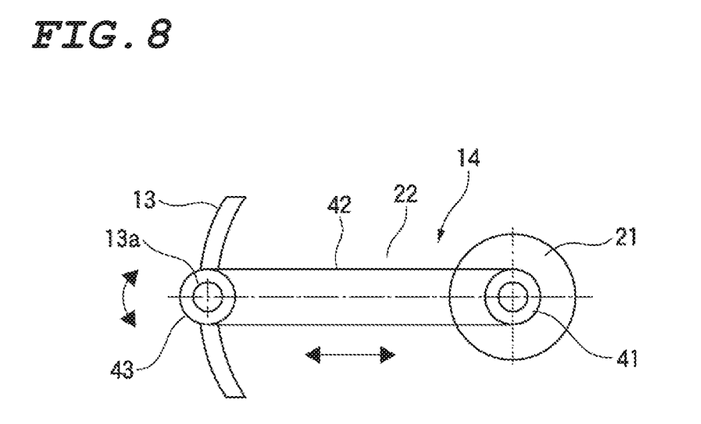
FIG. 8 is a typical view of another example of the drive mechanism, when the reflecting member and drive mechanism are viewed from the side surfaces thereof.

FIG. 8 is a typical view of another example of the drive mechanism, when the reflecting member and drive mechanism are viewed from the side surfaces thereof.

As shown in FIG. 8, this drive mechanism 14 includes a transmission part 22 having a transmission belt 42. The transmission belt 42 of the transmission part 22 is wrapped around a drive pulley 41 provided in the drive part 21 and a driven pulley 43 provided on the rotation shaft 13a of the reflecting member 13. In the head-up display apparatus 10 including this drive mechanism 14, when power is supplied to the drive part 21 to rotate the drive pulley 41 of the drive part 21, the rotation force of the drive pulley 41 is transmitted to the driven pulley 43 by the transmission belt 42 of the transmission part 22, thereby swinging the reflecting member 13. This changes the irradiation angle of the display light L reflected by the reflecting member 13 into the projection area TA and the visual confirmation position of the virtual image changes according to the height of the eye point EP of a driver.

Next, description is given of a head-up display apparatus according to modifications.

(Modification 1)

Figure 9:
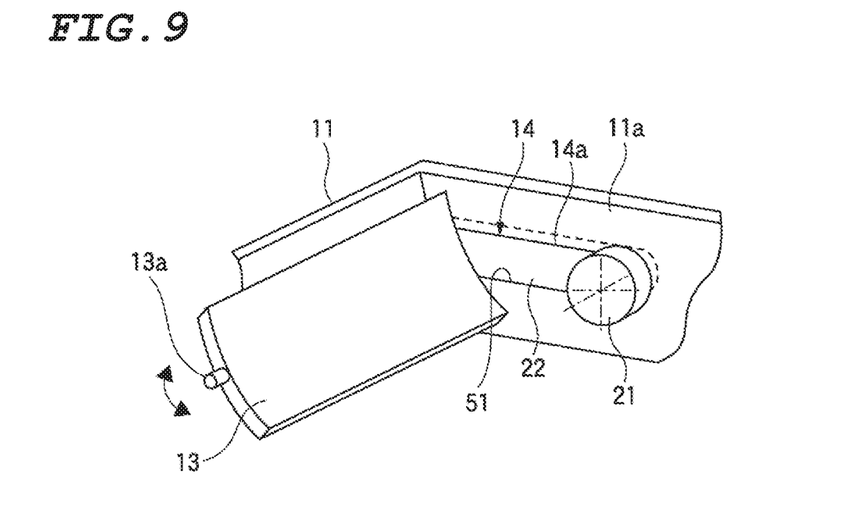
FIG. 9 is a perspective view of a reflecting member and a drive mechanism included in a head-up display apparatus according to a modification 1.

As shown in FIG. 9, in a modification 1, in the inner surface of the side wall 11a of the case 11 on the side where the drive mechanism 14 is arranged, there is formed a storage part 51 constituted of a recess part or a hole part. In this storage part 51, there is stored the drive mechanism 14.

According to the modification 1, the drive mechanism 14 is stored in the storage part 51 of the side wall 11a of the case 11, thereby enabling reduction in the width dimension of the case 11 by an amount corresponding to the thickness of the side wall 11a. This can further downsize the whole head-up display apparatus 10. Also, since the mechanism parts of the drive mechanism 14 are directly stored into the storage part 51 of the side wall 11a for incorporation, the storage case 14a for covering the mechanism parts can be omitted.

(Modification 2)

Figure 10:
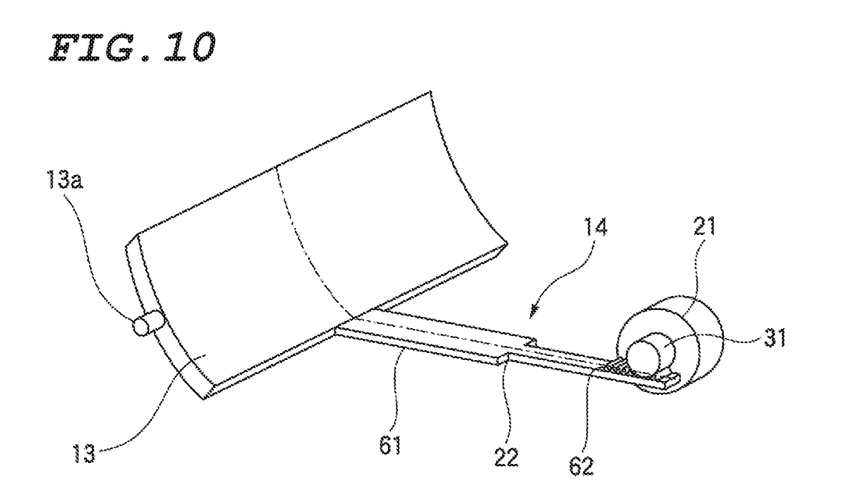
FIG. 10 is a perspective view of a reflecting member and a drive mechanism included in a head-up display apparatus according to a modification 2.
Figure 11:
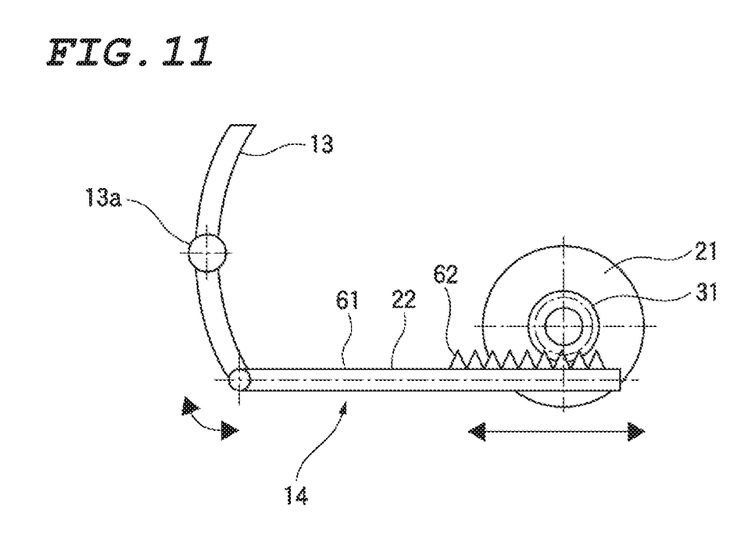
FIG. 11 is a side view of the reflecting member and drive mechanism of the head-up display apparatus according to the modification 2.

FIG. 10 is a perspective view of a reflecting member and a drive mechanism included in a head-up display apparatus according to a modification 2. FIG. 11 is a side view of the reflecting member and drive mechanism of the head-up display apparatus according to the modification 2.

As shown in FIGS. 10 and 11, in the modification 2, the drive mechanism 14 includes a transmission part 22 constituted of a transmission arm 61. One end of the transmission arm 61 is, centrally in the width direction of a reflecting member 13 existing along the swing axis, connected to one of the edges of the reflecting member 13 in the direction perpendicular to the swing axis thereof, namely, the lower end thereof such that it can rotate about the horizontal axis. The transmission arm 61 includes a rack 62 in the upper surface on the other end side thereof. The rack 62 is engaged with a drive gear 31 provided in the drive part 21.

In this modification 2, when power is supplied to the drive part 21 of the drive mechanism 14 to rotate the drive gear 31 of the drive part 21, the transmission arm 61 having the rack 62 engaged with the drive gear 31 moves back and forth, thereby swinging the reflecting member 13 with the transmission arm 61 connected thereto. This changes the irradiation angle of the display light L reflected by the reflecting member 13 into the projection area TA, whereby the visual confirmation position of the virtual image changes according to the height of the eye point EP of a driver.

In the modification 2 as well, the drive mechanism 14 is arranged in the dead space DS shifted from the optical path of the display light L from the display 12 within the case 11. Specifically, on the lower side of the optical path of the display light L from the display 12 within the case 11, the drive mechanism 14 is arranged in the dead space DS shifted from the optical path.

Therefore, in the modification 2 as well, effective use of the space within the case 11 enables downsizing of the whole apparatus, whereby the apparatus can be easily stored into the instrument panel 2 of the vehicle S difficult to secure the large storage space 3.

Here, in the structure where a rotation force is applied to the rotation shaft 13a serving as one-side support portion for supporting the reflecting member 13 swingably around the swing axis to swing the reflecting member 13, when swinging the reflecting member 13, there is applied such force to the reflecting member 13 as causes it to be twisted. Particularly, when the reflecting member 13 is large, such twist producing force is large.

Meanwhile, in the modification 2, the transmission arm 61, connected to the lower edge of the swing-axis direction middle portion of the reflecting member 13 extending in a direction perpendicular to the swing axis, is linearly moved by the drive part 21. Therefore, when compared with the structure where a rotation force is applied to one of the rotation shafts 13a support portions supporting the reflecting member 13 swingably about the swing axis to thereby swing the reflecting member 13, twisting of the reflecting member 13 can be suppressed, whereby the virtual image can be formed properly in the projection area TA.

Here, in the above embodiment, the head-up display apparatus 10 is structured such that the display light L reflected by the reflected is irradiated into the projection area TA of the windshield 1 of the vehicle S to form the virtual image. However, of course, the invention can also apply to a head-up display apparatus structured such that the display light L is irradiated into the projection area of a combiner arranged on the upper side of the instrument panel 2 of the vehicle S to form a virtual image.

Here, the invention is not limited to the above embodiment but can be modified or improved properly. Also, the material, shapes, dimensions, arranging locations and the like of the respective composing elements of the above embodiment are arbitrary so long as they can attain the invention, and thus are not limitative.

Here, the characteristics of the embodiment of the head-up display apparatus of the invention are listed briefly and collectively in the following structures (1) to (3).

(1) A head-up display apparatus (10) stored in a storage space (3) within an instrument panel (2) of a vehicle for irradiating a display light into a projection area (TA) on an upper side of the instrument panel to form a virtual image, the head-up display apparatus comprising:
a display (12) for emitting the display light;
a reflecting member (13) supported swingably about a swing axis for reflecting the display light from the display toward the projection area;
a drive mechanism (14) arranged in the reflecting member for swinging the reflecting member; and
a case (11) storing the display, the reflecting member and the drive mechanism,
wherein the drive mechanism includes a drive part (21) and a transmission part (22) for transmitting the drive force of a drive part to the reflecting member, and
wherein the drive mechanism is arranged at a position shifted from an optical path of the display light nearer the display than the reflecting member.

(2) The head-up display apparatus according to the above (1) structure, wherein the drive mechanism is stored in a storage part (51) provided with a recess part or a hole part formed in a side wall (11a) constituting the case.

(3) The head-up display apparatus according to the above (1) or (2) structure, wherein the transmission part is provided with a transmission arm (61) connected to one of the edges of the reflecting member in a direction perpendicular to the swing axis at a middle portion of the reflecting member along the swing axis; and
wherein the reflecting member is swung, when the transmission arm is moved linearly by the drive part.

Although description has been given heretofore specifically with reference to the specific embodiment thereof, it is obvious to a person skilled in the art that various changes and modifications are possible without departing from the spirit and scope of the invention.

INDUSTRIAL APPLICABILITY

According to the invention, there can be provided an effect that the apparatus can be downsized and thus can be installed even in a small space. The invention providing this effect can be effectively applied to a head-up display apparatus which projects a virtual image into the projection area of a combiner arranged above a windshield or an instrument panel of a vehicle, thereby enabling visual confirmation of the foreground of the vehicle and the virtual image.

DESCRIPTION OF REFERENCE NUMERALS AND SIGNS

2: Instrument panel
3: Storage space
10: Head-up display apparatus
11: Case
11a: Side wall
12: Display
13: Reflecting member
14: Drive mechanism
21: Drive part
22: Transmission part
51: Storage part
61: Transmission arm
L: Display light
S: Vehicle
TA: Projection area

What is claimed is:

1. A head-up display apparatus that is stored in a storage space within an instrument panel of a vehicle and is configured to irradiate a display light into a projection area on an upper side of the instrument panel to form a virtual image, the head-up display apparatus comprising:
a display configured to emit the display light;
a reflecting member that is supported swingably about a swing axis and is configured to reflect the display light from the display toward the projection area;
a drive mechanism that is arranged in the reflecting member and is configured to swing the reflecting member; and
a case for storing the display, the reflecting member and the drive mechanism, wherein the case comprises:
a side wall; and
a storage part provided with a recess part or a hole part formed in the side wall,
wherein the drive mechanism includes a drive part and a transmission part for transmitting a drive force of the drive part to the reflecting member,
wherein the drive mechanism is arranged at a position shifted from an optical path of the display light nearer to the display than the reflecting member, and
wherein the drive mechanism is stored in the storage part.

2. A head-up display apparatus that is stored in a storage space within an instrument panel of a vehicle and is configured to irradiate a display light into a projection area on an upper side of the instrument panel to form a virtual image, the head-up display apparatus comprising:
a display configured to emit the display light;
a reflecting member that is supported swingably about a swing axis and configured to reflect the display light from the display toward the projection area;

a drive mechanism is arranged in the reflecting member and configured to swing the reflecting member; and
a case for storing the display, the reflecting member and the drive mechanism,
wherein the drive mechanism includes a drive part and a transmission part for transmitting a drive force of the drive part to the reflecting member,
wherein the drive mechanism is arranged at a position shifted from an optical path of the display light nearer to the display than the reflecting member,
wherein the transmission part is provided with a transmission arm connected to one edge of the reflecting member in a direction perpendicular to the swing axis at a middle portion of the reflecting member along the swing axis, and
wherein the transmission arm is configured to be moved linearly by the drive part, and the reflecting member is configured to be swung in a case that the transmission arm is moved linearly by the drive part.

3. The head-up display apparatus according to claim 1, wherein the reflecting member has a curved surface.

4. The head-up display apparatus according to claim 2, wherein the reflecting member has a curved surface.

5. A head-up display apparatus that is stored in a storage space within an instrument panel of a vehicle and is configured to irradiate a display light into a projection area on an upper side of the instrument panel to form a virtual image, the head-up display apparatus comprising:
a display configured to emit the display light;
a reflecting member that is supported swingably about a swing axis and is configured to reflect the display light from the display toward the projection area;
a drive mechanism that is arranged in the reflecting member and is configured to swing the reflecting member; and
a case for storing the display, the reflecting member and the drive mechanism, wherein the case comprises:
a side wall; and
a storage part provided with a recess part or a hole part formed in the side wall,
wherein the drive mechanism includes a drive part and a transmission part for transmitting a drive force of the drive part to the reflecting member,
wherein the drive mechanism is arranged at a position shifted from an optical path of the display light nearer to the display than the reflecting member,
wherein the swing axis extends in a direction orthogonal to a direction connecting the display to the reflecting member and a rotating shaft of the drive part extends in parallel with the swing axis, and
wherein the drive mechanism is stored in the storage part.

* * * * *